(12) United States Patent
Unger

(10) Patent No.: US 10,603,972 B2
(45) Date of Patent: Mar. 31, 2020

(54) SITUATION DETECTION IN ACTIVE SUSPENSIONS

(71) Applicant: AUDI AG, Ingolstadt (DE)

(72) Inventor: Andreas Unger, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 129 days.

(21) Appl. No.: 15/770,396

(22) PCT Filed: Sep. 8, 2016

(86) PCT No.: PCT/EP2016/001520
§ 371 (c)(1),
(2) Date: Apr. 23, 2018

(87) PCT Pub. No.: WO2017/067624
PCT Pub. Date: Apr. 27, 2017

(65) Prior Publication Data
US 2018/0319237 A1 Nov. 8, 2018

(30) Foreign Application Priority Data

Oct. 23, 2015 (DE) .......................... 10 2015 013 802

(51) Int. Cl.
*B60G 17/016* (2006.01)
*B60W 50/08* (2020.01)
(Continued)

(52) U.S. Cl.
CPC ....... *B60G 17/0164* (2013.01); *B60G 17/016* (2013.01); *B60G 17/018* (2013.01);
(Continued)

(58) Field of Classification Search
CPC ............. B60G 17/0164; B60G 17/016; B60G 17/0165; B60G 17/018; B60G 2400/204;
(Continued)

(56) References Cited

U.S. PATENT DOCUMENTS

| 5,432,700 A | 7/1995 | Hrovat et al. |
| 2008/0234900 A1* | 9/2008 | Bennett ............. B60G 17/0165 701/48 |

(Continued)

FOREIGN PATENT DOCUMENTS

| DE | 19539887 A1 | 4/1997 |
| DE | 102012006468 A1 | 10/2013 |
| WO | 2015185198 A1 | 12/2015 |

OTHER PUBLICATIONS

German Search Report dated Jun. 27, 2016 of corresponding German application No. 102015013802.2; 8 pgs.
(Continued)

*Primary Examiner* — Sze-Hon Kong
(74) *Attorney, Agent, or Firm* — Maier & Maier, PLLC

(57) ABSTRACT

A method for controlling an operating mode of a controller for at least one suspension component of an at least partially active suspension of a vehicle. In accordance with at least one control command provided by a user for steering the vehicle, a situation detection is carried out to detect a control situation in which the at least one suspension component of the suspension which should be at least partially actively controlled, can be potentially controlled, and in the event that a control situation is detected, at least one reactive controller for controlling the at least one suspension component is switched from a first operating mode to a second operating mode, the at least one reactive controller being switched into the second operating mode with an increased bandwidth and amplification when compared with the first operating mode.

9 Claims, 2 Drawing Sheets

(51) Int. Cl.
*B60G 17/018* (2006.01)
*B60W 10/18* (2012.01)
*B60W 10/22* (2006.01)
*B60G 17/0165* (2006.01)

(52) U.S. Cl.
CPC ......... *B60G 17/0165* (2013.01); *B60W 10/18* (2013.01); *B60W 10/22* (2013.01); *B60W 50/085* (2013.01); *B60G 2400/102* (2013.01); *B60G 2400/204* (2013.01); *B60G 2400/823* (2013.01); *B60G 2600/1877* (2013.01); *B60G 2600/85* (2013.01); *B60G 2800/162* (2013.01); *B60G 2800/22* (2013.01); *B60G 2800/85* (2013.01)

(58) Field of Classification Search
CPC ...... B60G 2400/823; B60G 2600/1877; B60G 2600/85; B60G 2800/162; B60G 2800/22; B60G 2800/85; B60G 2400/102; B60W 10/18; B60W 10/22; B60W 50/085
See application file for complete search history.

(56) References Cited

U.S. PATENT DOCUMENTS

| 2010/0076649 | A1* | 3/2010 | Iyoda | B60G 17/0162 701/38 |
| 2013/0141578 | A1* | 6/2013 | Chundrlik, Jr. | H04N 7/181 348/148 |
| 2014/0297119 | A1* | 10/2014 | Giovanardi | F15B 13/0444 701/38 |
| 2015/0202939 | A1* | 7/2015 | Stettner | B60R 21/36 701/37 |
| 2015/0224845 | A1* | 8/2015 | Anderson | B60G 17/019 701/37 |
| 2016/0272171 | A1* | 9/2016 | Bunk | B60W 10/20 |
| 2017/0137023 | A1* | 5/2017 | Anderson | B60G 17/0195 |

OTHER PUBLICATIONS

International Search Report dated Jul. 3, 2017 in corresponding Application No. PCT/EP2016/001520; 13 pgs.
The Examination Report dated May 27, 2019 in corresponding German patent application No. 10 2015 013 802.2 including partial machine-generated English language translation; 10 pages.
Notification of Transmittal of Translation of the International Preliminary Report on Patentability dated May 3, 2018, in connection with corresponding international Application No. PCT/EP2016/001520 (8 pgs.).
German Search Report dated Jun. 27, 2016 of corresponding German application No. 102015013802.2; 10 pgs.
International Search Report dated Jul. 3, 2017 in corresponding Application No. PCT/EP2016/001520; 16 pgs.

* cited by examiner

SITUATION DETECTION IN ACTIVE SUSPENSIONS

FIELD

The present invention relates to a method for controlling an operating mode of a controller for at least one suspension component of an at least partially active suspension of a vehicle. The present invention further relates to a control instrument configured for carrying out the proposed method.

BACKGROUND

Vehicles with active or partially-active suspensions, which automatically adjust to current roadway conditions, usually comprise a so-called "reactive" controller as well as a so-called "proactive" path. By means of the reactive controller, it is possible to compensate for any uneven place or roadway conditions after a respective vehicle has driven onto a respective section of the route or a respective segment of the roadway. In contrast, in a proactive control method, an anticipatory approach using a sensor system, for example, is utilized in order to provide a manipulated variable for adjusting or controlling the suspension of the respective vehicle directly upon first contact with any uneven place or with a potentially relevant segment of a roadway, and for adapting the vehicle in advance precisely to the segment of roadway being traveled.

Both reactive controllers and proactive control methods have advantages and disadvantages. In a proactive control method, for example, it is possible to adjust an actuator position of a component of a suspension of a vehicle to the shape of a bump when it is driven over, as determined in the anticipatory approach, so that the bump, as it was determined in the anticipatory approach, is completely compensated for and the vehicle is adapted optimally to the bump or the corresponding segment of roadway. Because, however, a data set of sensor data acquired by a respective sensor system in the anticipatory approach is usually subject to errors, the shape and position of any arising uneven place, such as, for example, the mentioned bump, deviate from an actual shape or position of the corresponding uneven place. Through a corresponding adjustment or control of, for example, an actuator of a vehicle suspension in accordance with the acquired data set, it may happen that the suspension is adjusted incorrectly owing to, for example, measurement errors in the data set and, accordingly, the suspension responds incorrectly to the actual uneven place. As a result of such an incorrect adjustment of components of the suspension, the vehicle may become destabilized and is placed in a dangerous situation.

In regard to the reactive control by means of the reactive controller, it is thereby possible through a fast-operating reactive controller to adjust a suspension of a vehicle in such a way that a plurality of uneven places are compensated for, wherein a complete, that is, a one hundred percent, adaptation to respective uneven places usually cannot be achieved. Furthermore, reactive controllers act adversely on a driving behavior of a respective vehicle when they are adjusted too fast, that is, with a bandwidth or amplification that is too high, so that usually a more sluggish adjustment or a parameterization of adjustments is chosen, as a result of which any uneven place cannot be completely compensated for.

SUMMARY

Against this background, a method for controlling an operating mode of a controller for at least one suspension component of an at least partially active suspension of a vehicle is presented, in which, depending on at least one control command provided by a user for steering the vehicle, a situation detection for detecting a control situation is carried out, in which the at least one suspension component of the suspension that is to be at least partially actively controlled can be potentially controlled, and, in the event that a control situation is detected, at least one reactive controller for controlling the at least one suspension component is switched from a first operating mode to a second operating mode, wherein the at least one reactive controller is switched to the second operating mode with an increased bandwidth and amplification when compared to the first operating mode, so that, depending on a respectively detected control situation, the at least one reactive controller controls said situation with a shorter reaction time in comparison to normal operation.

The proposed method serves, in particular, for choosing an operating mode of a respective reactive controller of a vehicle, without an additional sensor system being needed for detecting a roadway height profile. Instead, the proposed method is based on an evaluation of driving signals, that is, of control commands provided by a user of a respective vehicle, in order to detect a control situation in which the reactive controller should be switched from a first operating mode to a second operating mode, so that the reactive controller quickly detects any arising uneven places on the roadway and a correspondingly fast control of suspension components can take place, as a result of which the driving comfort and driving safety of the vehicle are substantially increased.

In order to then switch reactive controllers solely to the second operating mode and otherwise to leave it in the first operating mode, it is provided in accordance with the invention that a situation detection is carried out on the basis of control commands provided by a user. This means that control commands, such as, for example, changes in positions of the accelerator pedal and/or the brake pedal, are evaluated in regard to a driving situation, in which a potential need for control of respective suspension components exists, that is, a control situation. For this purpose, the control commands can be checked against, for example, a pre-determined list of control commands or against ranges for control commands, such as, for example, a speed range between 20 km/h and 70 km/h. Accordingly, for example, it is provided that the reactive controller is then switched to the second operating mode when a user strongly brakes in front of an obstacle and a respective vehicle is strongly slowed down, starting from a constant speed within a pre-determined range to a pre-determined threshold, for example.

In the context of the present invention, a control command is understood to mean each input of a user for changing a driving situation of a respective vehicle. Control commands are accordingly both changes in positions of respective actuators and changes in respective driving parameters of the vehicle, such as, for example, a speed or an acceleration.

In the context of the proposed method, a switching of the reactive controller from a first operating mode to a second operating mode is understood to mean, in particular, also an activation of a fast reactive controller and a deactivation of a reactive controller that is connected to it and is slow in comparison to it.

In the context of the present invention, a high bandwidth is understood to mean a bandwidth that is increased in comparison to normal operation, in particular by 50%, 100%, or 1000%.

In the context of the present invention, the term "amplification" describes a transformation of a signal, such as, for example, a level, using, for example, an offset or a multiplier, wherein the transformation can both enhance as well as diminish original sensor data.

In a possible embodiment of the proposed method, it is provided that the control situation is detected with evaluation at least of a control command for controlling driving parameters taken from the following list of driving parameters of the vehicle: brake pressure, vehicle speed, acceleration, and control system intervention.

Suitable for the detection of a control situation are, in general, all changes in driving parameters or all control commands that lead to changes in driving parameters. Because, through the situation detection provided in accordance with the invention, braking operations before obstacles, such as, for example, speed bumps particularly, are to be detected, the driving parameters of speed and braking pressure are suitable, in particular, for the detection of a control situation.

Obviously, a control system intervention, such as, for example, an activation of a stabilization program can also be used as an indication that a control situation has been detected.

In another possible embodiment of the proposed method, it is provided that the at least one reactive controller is switched to the second operating mode only when, in the event that the user initiates a braking or braking operation in accordance with a control situation, the vehicle was moving within a pre-determined range prior to the braking.

During switching of the reactive controller provided in accordance with the invention to the second operating state, it is to be noted that the second operating mode of the reactive controller can negatively influence a driving behavior of a respective vehicle at high speeds, so that the control situation should solely be detected when the vehicle is moving at a speed below a specific speed threshold. Accordingly, it is provided that the reactive controller is switched to the second operating mode only when, through the second operating mode, there ensues no danger for the vehicle, that is, in particular, when the vehicle is moving at a speed below a pre-determined threshold.

In another possible embodiment of the proposed method, it is provided that the control situation is chosen from a pre-determined list of control situations, each of which place at least one condition on the control command provided by the user in order to be chosen.

In order to activate the reactive controller not only in a specific control situation, but in a plurality of control situations—for example, before driving over a speed bump and before driving along a field track—or to cover various driving maneuvers for different driving styles, lists with a plurality of control situations can be used, which can be used in full or in part, depending on a current suspension adjustment, for checking against respective control commands, for example.

In another possible embodiment of the proposed method, it is provided that, in the event that the at least one reactive controller has been switched to the second operating mode, and, in a pre-determined time period, no control of the at least one suspension component has been detected, the at least one reactive controller is switched back again automatically to the first operating mode after the pre-determined time period has elapsed.

In order to switch the reactive controller provided in accordance with the invention from the second operating mode back again to the first operating mode, it can be provided that either a fixed time period is chosen, after which the switching back to the first operating mode occurs, or that, for example, the switching back occurs under a postponing condition, so that when, for example, a control of a suspension component occurs within a pre-determined window of time after switching the reactive controller to the second operating mode, the reactive controller remains in the second operating mode for an additional window of time.

In another possible embodiment of the proposed method, it is provided that, in the event that the at least one reactive controller has been switched to the second operating mode and, in a pre-determined time period, a vertical acceleration of a superstructure of the vehicle that is greater than a pre-determined threshold value is detected, the at least one reactive controller is switched to the first operating mode only when the vertical acceleration of the superstructure of the vehicle drops once again below the pre-determined threshold value.

For the determination of a point in time for shifting back from the second operating mode to the first operating mode, it is possible to use any technically suitable vehicle parameter, in particular a vertical acceleration of a vehicle superstructure. Besides a current speed, which usually varies little when driving over an obstacle, the vertical acceleration of the vehicle superstructure is suitable especially well for detecting a drive over an obstacle, because obstacles usually have a strong effect on the vertical acceleration of the vehicle superstructure and induce vibrations or oscillations in the vehicle.

In another possible embodiment of the proposed method, it is provided that, in the event that the user provides the at least one control command in such a way that a control situation is detected and a sensor of the vehicle detects a braking of a vehicle driving ahead, the at least one reactive controller is left in the first operating mode.

In order to make it possible to switch the operating mode in situations in which no obstacle is anticipated, but nonetheless typical control commands are detected for driving over an obstacle, such as, for example, when there is a deceleration due to a vehicle traveling ahead, sensor data from, for example, a distance sensor, such as, for example, a radar sensor or an ultrasound sensor, can be processed. Accordingly, it is provided that the reactive controller is not switched to the second operating mode when a vehicle traveling ahead is the cause of a respective braking or respective control commands.

In another possible embodiment of the proposed method, it is provided that the at least one suspension component of the vehicle is chosen from the following list of suspension components: actuators, bumpers, shock absorber bump stops, pressure regulators, brake systems, electric motors, hydraulic cylinders, or control instruments.

The reactive controller can be used for actuating any technically suitable component in order to influence the suspension comfort of a vehicle. In particular, the proposed method is suitable for the situation-dependent actuation of actuators of an active or partially-active suspension.

The present invention further relates to a control instrument for controlling an operating mode of a controller for at least one suspension component of an at least partially active suspension of a vehicle, wherein the control instrument is configured in such a way as to carry out, depending on at least one control command provided by a user for steering the vehicle, a situation detection for detecting a control situation in which the at least one suspension component of the suspension that is to be at least partially actively controlled can potentially be controlled, and, in the event that a control situation is detected, to switch at least one reactive controller for controlling the at least one suspension component from a first operating mode to a second operating mode, wherein the at least one reactive controller is to be switched to the second operating mode with an increased bandwidth and amplification when compared to the first operating mode, so that the at least one reactive controller is to be controlled depending on a respective detected control situation with a shorter reaction time in comparison to normal operation.

The proposed control instrument serves, in particular, for implementing the proposed method.

Further advantages and embodiments of the invention ensue from the description and the appended drawing.

It is understood that the features mentioned above and the features still to be mentioned below can be used not only in the respectively presented combination, but also in other combinations or alone, without departing from the scope of the present invention.

BRIEF DESCRIPTION OF THE DRAWING

The invention is illustrated in the drawings on the basis of embodiments and is described schematically and in detail with reference to the drawings.

DETAILED DESCRIPTION OF THE DRAWING

Figure 1:
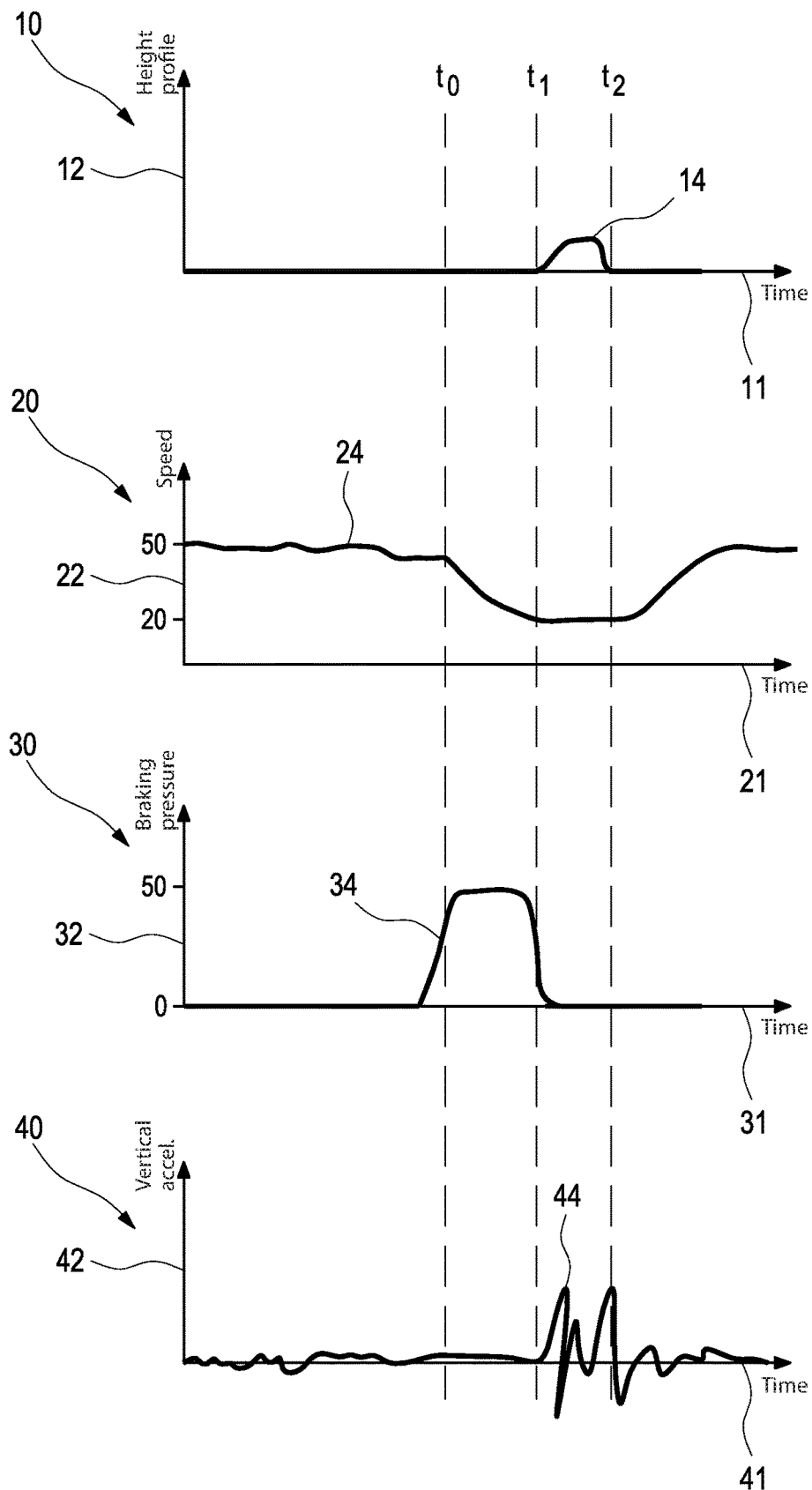
FIG. 1 shows a schematic overview of a procedure of a possible embodiment of the proposed method.

Illustrated in FIG. 1 are different values for driving over a speed bump in city traffic. A diagram 10, which extends over a time plotted on the abscissa 11 and height profile plotted on the ordinate 12, shows the course of the height, illustrated by the plotted curve 14, of a roadway with a speed bump, which is driven over between points in time t1 and t2 by a vehicle that is to be controlled.

A diagram 20, which extends over a time plotted on the abscissa 21 and a speed plotted on the ordinate 22, shows the course of speed of the vehicle illustrated by the plotted curve 24. After a point in time t0 the speed course is reduced from 50 km/h to 20 km/h. After the speed bump has been driven over at the point in time t2, the speed increases again to 50 km/h.

In the diagram 30, which extends over a time plotted on the abscissa 31 and a braking pressure plotted on the ordinate 32, the plotted curve 34 illustrates the course of braking pressure of the vehicle when it approaches and drives over the speed bump. At the point in time t0, the braking pressure increases in order to decelerate the vehicle and remains constant during the entire approach to the speed bump up to the point in time t1. At the point in time t1, the braking pressure is reverted to an initial value.

In the diagram 40, a vertical acceleration of a superstructure of the vehicle is illustrated by a plotted curve 44, which extends over time on the abscissa and over a vertical acceleration on the ordinate 42. At the point in time t0, the superstructure is slightly accelerated on account of the deceleration. When the speed bump is driven over at the point in time t1, the superstructure of the vehicle is strongly accelerated repeatedly. After the point in time t2, a reverberating vibration due to shock absorber forces of a suspension of the vehicle is detectable.

In accordance with the invention, it is provided that, on account of the plotted curves 34 and 24, which are characteristic of driving onto a speed bump, the reactive controller is switched to an operating mode with increased bandwidth and amplification, so that respective suspension components of the vehicle are controlled quickly, that is, with shorter reaction times in comparison to a standard setting, as a result of which the vertical acceleration, as in the plotted curve 44 between the time points t1 and t2 or after the point in time t2, is reduced and the comfort when the vehicle rolls off is increased.

Figure 2:
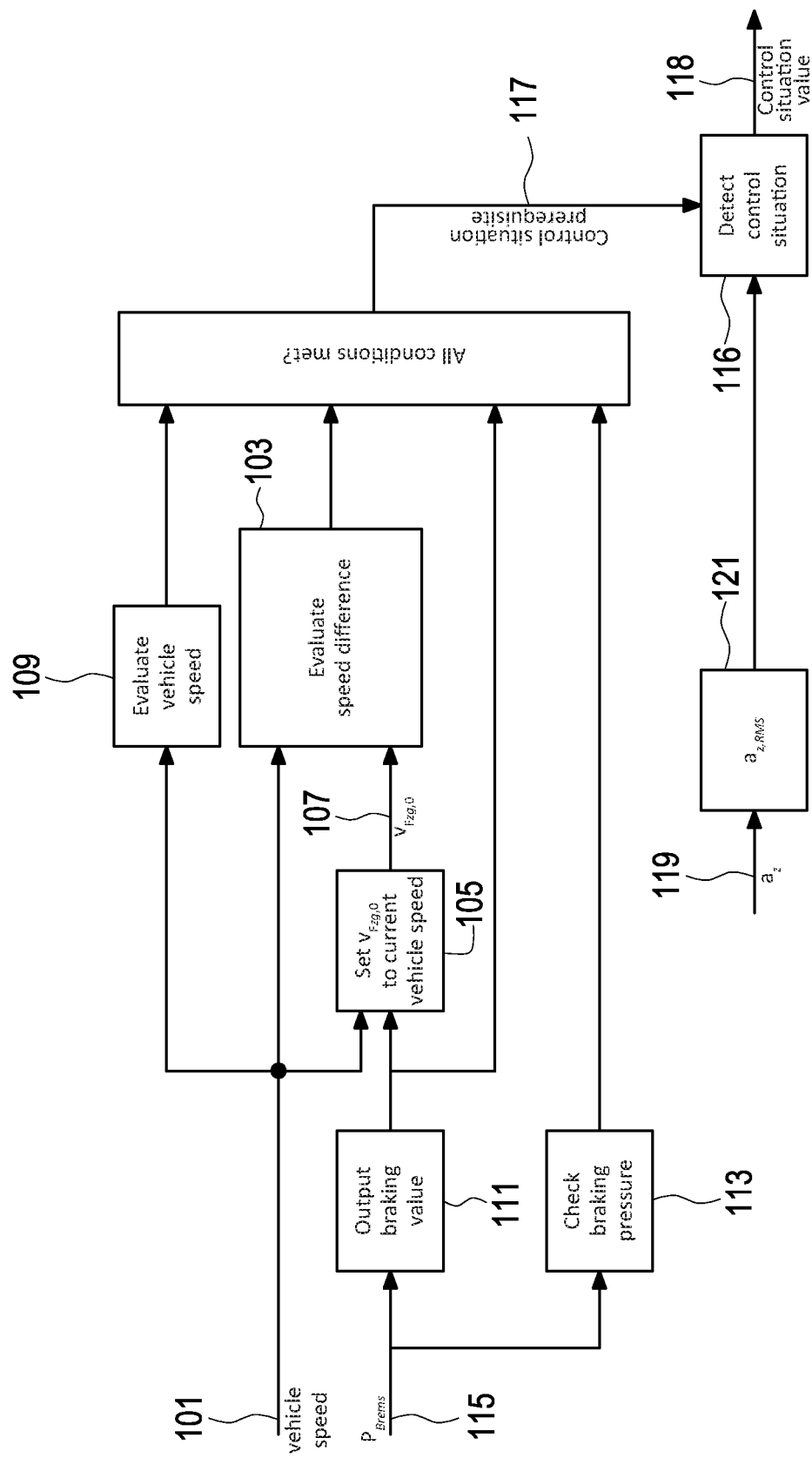
FIG. 2 shows another schematic overview of a procedure of a possible embodiment of the proposed method.

Illustrated in FIG. 2 is a flow chart for establishing the existence of a control situation. A reactive controller is always switched to a second operating mode when a parameter "control situation" 118 assumes the value 1.

The "control situation" parameter always assumes a value of 1 when the following scheme detects a control situation:
1. A speed "vehicle speed" 101 lies in a pre-determined range, such as, for example, between 15 km/h and 60 km/h. This prerequisite is checked in a method step 109 "speed window" through an evaluation of the value "vehicle speed" 101 according to Equation 1.

$$15\frac{\text{km}}{\text{h}} \le v_{Fzg} \le 60\frac{\text{km}}{\text{h}} \tag{1}$$

Here, $v_{Fzg}$ stands for a current vehicle speed.
2. Once an initiation of braking has been detected, the vehicle speed has to be reduced by a certain amount, such as, for example, by 10 km/h. This is checked by the following steps:
   a. In a method step 105 "set $v_{Fzg,0}$", a parameter 107 "$v_{Fzg,0}$" is set to a value of the current vehicle speed as soon as an initiation of braking is detected.
   b. Once the parameter $v_{Fzg,0}$ has been set to the current vehicle speed, it is possible in a method step 103 "speed difference" to evaluate a speed difference by means of, for example, Equation 2.

$$v_{Fzg,0} - v_{Fzg} > 1.0 \text{ km/h} \tag{2}$$

Here, $v_{Fzg,0}$ stands for an initial speed and $v_{Fzg}$ for a current vehicle speed.
3. A braking needs to be initiated immediately. A braking is detected in that the output of a method step 111 "braking initiated" is set to 1 as soon as a braking pressure has changed from a value=0 to a value >0. If the braking pressure drops again to the value=0, the output of the method step 111 "braking initiated" is again set to 0.
4. The braking must be active. For this purpose, in a method step 113 "braking active", it is checked with a query $p_{Brems}$>50 bar [Brems=braking] as to whether the braking pressure 115 lies above a threshold value (e.g., 50 bars).

If all conditions are met, as indicted by "&", a signal "control situation prerequisites" 117 is set to a value "1" and a method step 116 "control situation detected" is activated. For this purpose, a positive shoulder of the signal 117 "control situation prerequisites" is evaluated. If the positive shoulder is detected, then the signal 118 "control situation" is set—at least, for example, for 5 seconds—to a value "1". If, within the 5 seconds, no driving over a relevant uneven place is detected, the signal 118 "control situation" is set again to a value "0", for example, after 5 seconds.

The detection as to whether a relevant uneven place is driven over occurs using a vertical superstructure acceleration $a_z$ 119, which is converted to an energy value $a_{z,RMS}$ 121. The value $a_{z,RMS}$ 121 symbolizes an energy content of the superstructure acceleration $a_z$ 119 and can be determined, for example, by way of a sliding RMS value, that is, the root mean square or mean standard deviation, in a defined time window of $a_z$ 119. If the energy value $a_{z,RMS}$ 121 increases within the pre-determined period of, for example, 5 seconds, to above a pre-determined threshold value, the signal "control situation" is set back to 0 when the threshold value is again fallen short of. It is ensured in this way that the fast reactive controller is not deactivated again during driving over the uneven place.

In the proposed method, it is advantageous that the adjustment "control situation" occurs without the necessity of using a sensor system for detecting a roadway height profile.

The invention claimed is:

1. A method for controlling an operating mode of a controller for at least one suspension component of an at least partially active suspension of a vehicle, comprising:
depending on at least one control command provided by a user for steering the vehicle, a situation detection for detecting a control situation, wherein the at least one suspension component of the suspension that is to be at least partially actively controlled can potentially be controlled, is carried out, and, in the event that a control situation is detected, at least one reactive controller for controlling the at least one suspension component is switched from a first operating mode to a second operating mode, wherein the at least one reactive controller is switched to the second operating mode with an increased bandwidth and amplification when compared to the first operating mode, so that, depending on a respective detected control situation, the at least one reactive controller controls a situation with a shorter reaction time in comparison to a normal operation, wherein the at least one reactive controller is switched to the second operating mode only when, in the event that the user initiates a braking in accordance with a control situation, the vehicle was moving within a pre-determined speed range prior to the braking.

2. The method according to claim 1, wherein the control situation is detected with evaluation of at least one control command for controlling driving parameters taken from the following list of driving parameters of the vehicle: braking pressure, vehicle speed, acceleration, and control system intervention.

3. The method according to claim 1, wherein the control situation is chosen from a pre-determined list of control situations, which each place at least one condition on the control command provided by the user in order to be chosen.

4. The method according to claim 1, wherein in the event that the at least one reactive controller has been switched to the second operating mode and, in a pre-determined time period, no control of the at least one suspension component has been detected, the at least one reactive controller is automatically switched back again to the first operating mode after the pre-determined time period has elapsed.

5. The method according to claim 1, wherein in the event that the at least one reactive controller has been switched to the second operating mode, and, in a pre-determined time period, a vertical acceleration of a superstructure of the vehicle that lies above a pre-determined threshold value has been detected, the at least one reactive controller is switched back to the first operating mode only when the vertical acceleration of the superstructure of the vehicle again drops below the pre-determined threshold value.

6. The method according to claim 1, wherein in the event that the user has provided the at least one control command in such a way that a control situation is detected and a sensor of the vehicle has detected a braking of a vehicle driving ahead, the at least one reactive controller is left in the first operating mode.

7. The method according to claim 6, in which, a distance sensor is chosen as the sensor.

8. The method according to claim 1, wherein the at least one suspension component of the vehicle is chosen from the following list of suspension components: actuator, bumper, shock absorber bump stop, pressure regulator, braking system, electric motor, hydraulic cylinder, or control instrument.

9. A control instrument for controlling an operating mode of a controller for at least one suspension component of an at least partially active suspension of a vehicle, comprising:
the control instrument is configured for carrying out a situation detection for detecting, depending on at least one control command provided by a user for steering the vehicle, a control situation, in which the at least one suspension component of the suspension that is to be at least partially actively controlled can potentially be controlled, and, in the event that a control situation is detected, at least one reactive controller for controlling the at least one suspension component is switched from a first operating mode to a second operating mode, wherein the at least one reactive controller is switched to the second operating mode with an increased bandwidth and amplification when compared to the first operating mode, so that, depending on a particular detected control situation, the at least one reactive controller can control the situation with a shorter reaction time in comparison to a normal operation, wherein the at least one reactive controller is switched to the second operating mode only when, in the event that the user initiates a braking in accordance with a control situation, the vehicle was moving within a pre-determined speed range prior to the braking.

\* \* \* \* \*